(No Model.)

2 Sheets—Sheet 1.

C. W. SALADEE.

VEHICLE SPRING.

No. 267,988.   Patented Nov. 21, 1882.

Attest:
Courtney A. Cooper
T. E. Ansmann

Inventor:
C. W. Saladee
By his attorney
Charles E. Foster (No Model.)　　　　　C. W. SALADEE.　　　2 Sheets—Sheet 2.
VEHICLE SPRING.
No. 267,988.　　　　　　　Patented Nov. 21, 1882.
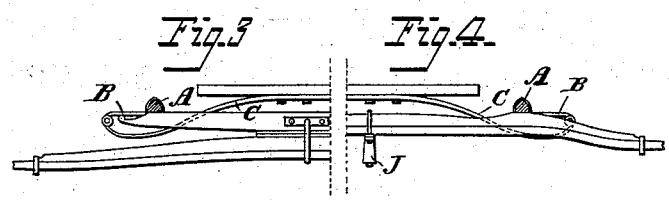
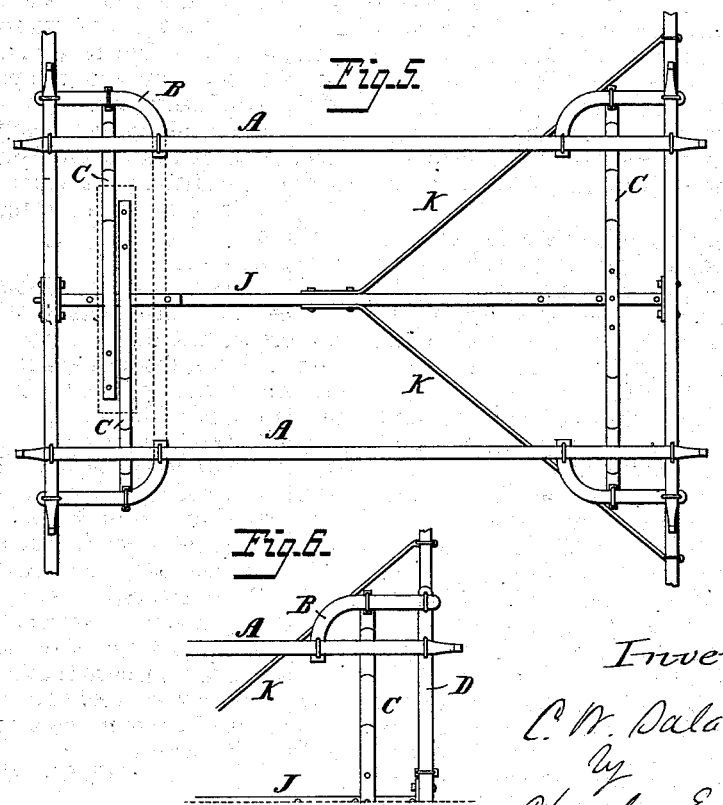

UNITED STATES PATENT OFFICE.

CYRUS W. SALADEE, OF TORRINGTON, CONNECTICUT.

VEHICLE-SPRING.

SPECIFICATION forming part of Letters Patent No. 267,988, dated November 21, 1882.

Application filed June 14, 1882. (No model.)

*To all whom it may concern:*

Be it known that I, CYRUS W. SALADEE, a citizen of the United States, and a resident of Torrington, in the county of Litchfield and State of Connecticut, have invented certain new and useful Improvements in Vehicles, of which the following is a specification.

My invention relates to "side bar" road-wagons; and it consists in extending the springs to and supporting them at a point beyond and outside the frame, thereby adding to their length and securing a correspondingly-increased motion to the body.

Figure 1:
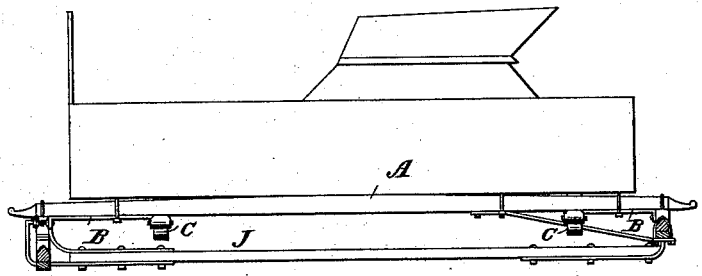
Figure 2:
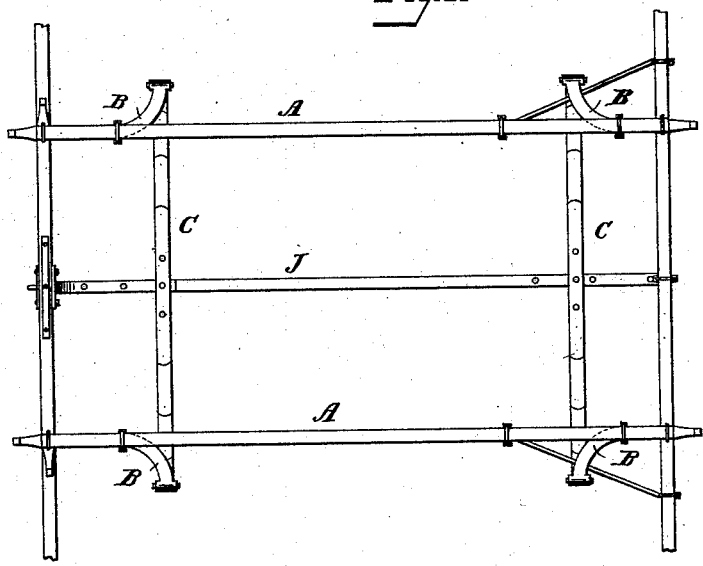

In the drawings, Figure 1 is a side elevation of the wagon body and frame illustrating my improvement. Fig. 2 is a plan view of the gear. Fig. 3 is a half front elevation of the frame and springs. Fig. 4 is a half rear elevation of the frame and springs, and Figs. 5 and 6 represent modifications.

The cross-springs C may be as represented, or of any suitable form, their outer ends being extended beyond the side bars, A, and there indirectly secured to the side bars by means of a brace, B, of any desired construction, which, as shown, lies along the under side of the bar A, and is rigidly secured thereto at a point inside of the bolster, or of the rear axle when no rear bolster is there used. In this mode of securing the brace B it is slightly flexional and torsional, and thus serves to supplement the main spring C; but, when preferred, the springs C may be attached to rigid braces connected to the side bars and bolsters, as in Fig. 5, and in this modification an advantage is secured which is not had in the other mode of attachment—that is, the connecting-braces serve as stays to retain the frame of the gear square.

Another plan is to hang the front spring C to a spring-brace, as in Fig. 2, and the rear spring to the rigid brace, as in Fig. 5.

Another modification is shown in Fig. 6, wherein the outer ends of the connected braces B and side bars, A, are supported upon end springs, D D. The rear axle may be maintained in its relation to the perch J by means of the axle-braces K K.

A special advantage results in using the springs as shown at the front end in Fig. 5, thereby permitting the use of crossed springs of great length and securing an easy-riding platform.

I claim—

1. The combination of the frame consisting of side bars and bolsters, and cross-springs and braces extending outward from the side bars, inside of the bolsters, and connecting the projecting ends of the springs to the frame, substantially as set forth.

2. The combination of the frame, cross-springs projecting beyond the sides of the frame, and spring connecting-braces attached to the side bars within the bolsters and extending beyond the side bars, as set forth.

3. In a side-bar road-wagon, the combination of the side bars, A, and springs D, and the connecting-braces B, attached to the springs, the bolsters, and the side bars, substantially as and for the purpose set forth.

In testimony whereof I have signed my name to this specification in the presence of two subscribing witnesses.

CYRUS W. SALADEE.

Witnesses:
C. L. MCNEIL,
ISAAC W. BROOKS.